May 12, 1970 D. T. SIMMONDS 3,512,135

PLUGGED-PROGRAM RELAY COMPUTER

Filed June 26, 1967 13 Sheets-Sheet 1

INVENTOR
D. T. SIMMONDS
BY
Cameron, Kerkam & Sutton
ATTORNEYS

| CODE | EMITTER | RECEIVER | ARITHMETIC FUNCTION CODES |
|---|---|---|---|
| 0 | ISW1, FIG. 5 | RLB STORE FIGS. 9,11 | |
| 1 | NEGATIVE ISW1, FIG. 5 | RLB STORE | |
| 2 | NEGATIVE RLMS, FIG. 7 | RLB STORE | |
| 3 | RLA STORE, FIGS. 9,11 | RLB STORE | |
| 4 | RLC STORE, FIG. 8 | RLMS STORE, FIG. 7 | |
| 5 | RLB STORE, FIGS. 9,11 | RLMS STORE | |
| 6 | ISW3, FIG. 5 | RLA STORE | |
| 7 | RLMS STORE, FIG. 7 | RLA STORE | |
| 8 | | | ADD |
| 9 | | | MULTIPLY |
| 10 | | | SUBTRACT |
| 11 | | | DIVIDE |
| 12 | | | CLEAR COUNTER STORE FOR DIVISION |
| 13 | NEGATIVE ISW2 | RLC STORE, FIG. 8 | |
| 14 | NEGATIVE RLMS | RLC STORE, FIG. 8 | |
| 15 | UNUSED | | |

FIG. 2

INVENTOR
D. T. SIMMONDS
BY
Cameron, Kerkam & Sutton
ATTORNEYS

INVENTOR
D. T. SIMMONDS
BY
Cameron, Kerkam & Sutton
ATTORNEYS

May 12, 1970 D. T. SIMMONDS 3,512,135

PLUGGED-PROGRAM RELAY COMPUTER

Filed June 26, 1967 13 Sheets-Sheet 4

INVENTOR

D. T. SIMMONDS

BY

Cameron, Kerkam & Sutton

ATTORNEYS

May 12, 1970 D. T. SIMMONDS 3,512,135

PLUGGED-PROGRAM RELAY COMPUTER

Filed June 26, 1967 13 Sheets-Sheet 5

INVENTOR

D. T. SIMMONDS

BY

Cameron, Kerkam & Sutton

ATTORNEYS

| | | |
|---|---|---|
| HIGHWAY 0 | ISW1. A1 TO E1, FIG.5 | RLB FIGS. 9-11 |
| HIGHWAY 1 | ISW1. A2 TO E2, FIG 5 | |
| HIGHWAY 2 | RLMS. A1 TO E1, FIG. 7 | |
| HIGHWAY 3 | RLA. A1 TO E1, FIGS.9,11 | |
| HIGHWAY 4 | RLC. A1 TO E1, FIG. 8 | RLM FIG. 7 |
| HIGHWAY 5 | RLB. A4 TO E4 FIGS 9, 11 | |
| HIGHWAY 6 | ISW3. A TO E, FIG. 5 | RLA FIGS. 9-11 |
| HIGHWAY 7 | RLMS. A2 TO E2, FIG. 7 | |
| HIGHWAY 13 | ISW.2. A TO E | RLC FIG. 8 |
| HIGHWAY 14 | RLMS. A3 TO E3 | |

FIG. 6

INVENTOR
D. T. SIMMONDS
BY
Cameron, Kerkam & Sutton
ATTORNEYS

INVENTOR
D. T. SIMMONDS
BY
Cameron, Kerkam & Sutton
ATTORNEYS

PLUGGED-PROGRAM RELAY COMPUTER

Filed June 26, 1967 13 Sheets-Sheet 8

INVENTOR
D. T. SIMMONDS
BY
Cameron, Kerkam & Sutton
ATTORNEYS

May 12, 1970 D. T. SIMMONDS 3,512,135

PLUGGED-PROGRAM RELAY COMPUTER

Filed June 26, 1967 13 Sheets-Sheet 9

*INVENTOR*

D. T. SIMMONDS

*BY*

Cameron, Kerkam & Sutton

*ATTORNEYS*

INVENTOR
D. T. SIMMONDS
BY
Cameron, Kerkam & Sutton
ATTORNEYS

INVENTOR
D. T. SIMMONDS
BY
Cameron, Kerkam & Sutton
ATTORNEYS

INVENTOR

D. T. SIMMONDS

BY

Cameron, Kerkam & Sutton

ATTORNEYS

INVENTOR
D. T. SIMMONDS
BY
Cameron, Kerkam & Sutton
ATTORNEYS

United States Patent Office 3,512,135
Patented May 12, 1970

3,512,135

PLUGGED-PROGRAM RELAY COMPUTER

David Thomas Simmonds, Luton, England, assignor to National Research Development Corporation, London, England, a British corporation Filed June 26, 1967, Ser. No. 648,732
Claims priority, application Great Britain, June 27, 1966, 28,599/66
Int. Cl. G06f 9/02
U.S. Cl. 340—172.5 9 Claims

ABSTRACT OF THE DISCLOSURE

An electro-mechanical computer working at moderate speeds and designed to be useful both for instructional purposes and to provide a cheap, easily maintained machine for elementary purposes, comprises a rotary sequence control switch, the individual positions of which are allotted to specific arithmetic and data transfer functions, selections of which can be rendered operative during a rotation of the sequence switch by an associated manual plugboard. The main components used are electro-mechanical contact-making relays and wiper switches, and signal transmission is by a common multi-bit binary code over multi-wire highways.

This invention relates to computers suitable for demonstrating the essential principles involved in commercial computers, either for people in industry who require a basic knowledge of their working or for educational establishments including schools.

A computer is not necessarily a machine for doing enormous calculations, with huge numbers, at lightning speed. It is true that modern digital machines are like this, but all a computer needs to be is a machine that can:

(a) Add two bits (for it can then do all arithmetic operations).

(b) Store or remember a collection of bits.

(c) Store a series of instructions, then follow them in order.

(d) Take input numbers and transfer them round the machine, altering them according to instructions.

(e) Display or print out selected results, when instructed, either as a binary number, or in some coded form.

(f) Jump back when instructed to a previous place in its sequence of instructions, and carry out some of them again—this avoids having to write out instructions repetitiously.

(g) Obey a conditional jump instruction. At this instruction the machine makes tests to discover which of two possible results has happened, and then takes one or other of two possible courses for the rest of the calculation. Since the "choice" made by the machine is governed by numbers generated by the computer itself, and not known to the operator at the start, this facility in a computer makes it seem to be thinking, and an understanding of what is going on is therefore needed, or we may respect the machine for being clever when it is not. Computers are only able to add 1 and 1 repeatedly, and need the most detailed instructions imaginable.

The object of the present invention is to provide a small cheap computer; designed to do all these things, but slowly, using simple contact-making relays and lamp indicators, so that an observer can see how each part works. It uses only small numbers, but this is not a drawback. The principles of a large computer are involved, and anyone who understands this machine would be able to do similar calculations on any digital computer.

One aspect of the invention comprises a computer comprising programme control means arranged to control the functions forming a programme and their sequence, a multi-bit function code decoder which comprises an electro-mechanical contact-making relay per bit, and circuits incorporating contacts of said relays for initiating any one of a number of computer functions under control of said programme control means, switching means operable in response to a Jump or Conditional Jump Instruction to make the programme control means traverse a plurality of functions in a programme sequence, an over-riding relay also operable in response to a Jump or Conditional Jump Instruction, and over-riding relay contacts in a battery-feed circuit common to said function-initiating circuits operation of which inhibits all said computer functions, so that the Jump is made without the performance of any functions allocated to function positions passed over during the Jump.

Another aspect of the invention comprises a computer comprising arithmetic equipment, information storage equipment, signalling channels interconnecting various parts of said equipments, an electro-mecanical contact-making wiper programme-switch, and means for selectively connecting each of a number of switch positions to one or more of a set of wires constituting an electrical multi-bit code signal channel, which is connected to an electrical function code decoder arranged to initiate the performance of the various functions as required.

The invention will be clearly understood from the following description of an embodiment shown in the accompanying drawings in which:

FIG. 2 is a list of the Machine Codes and the operations allocated thereto.

FIG. 6 is a chart of the 5-wire signal channels or highways between the various parts of the machine.

FIG. 12 shows the function decoder, while

Figure 1:
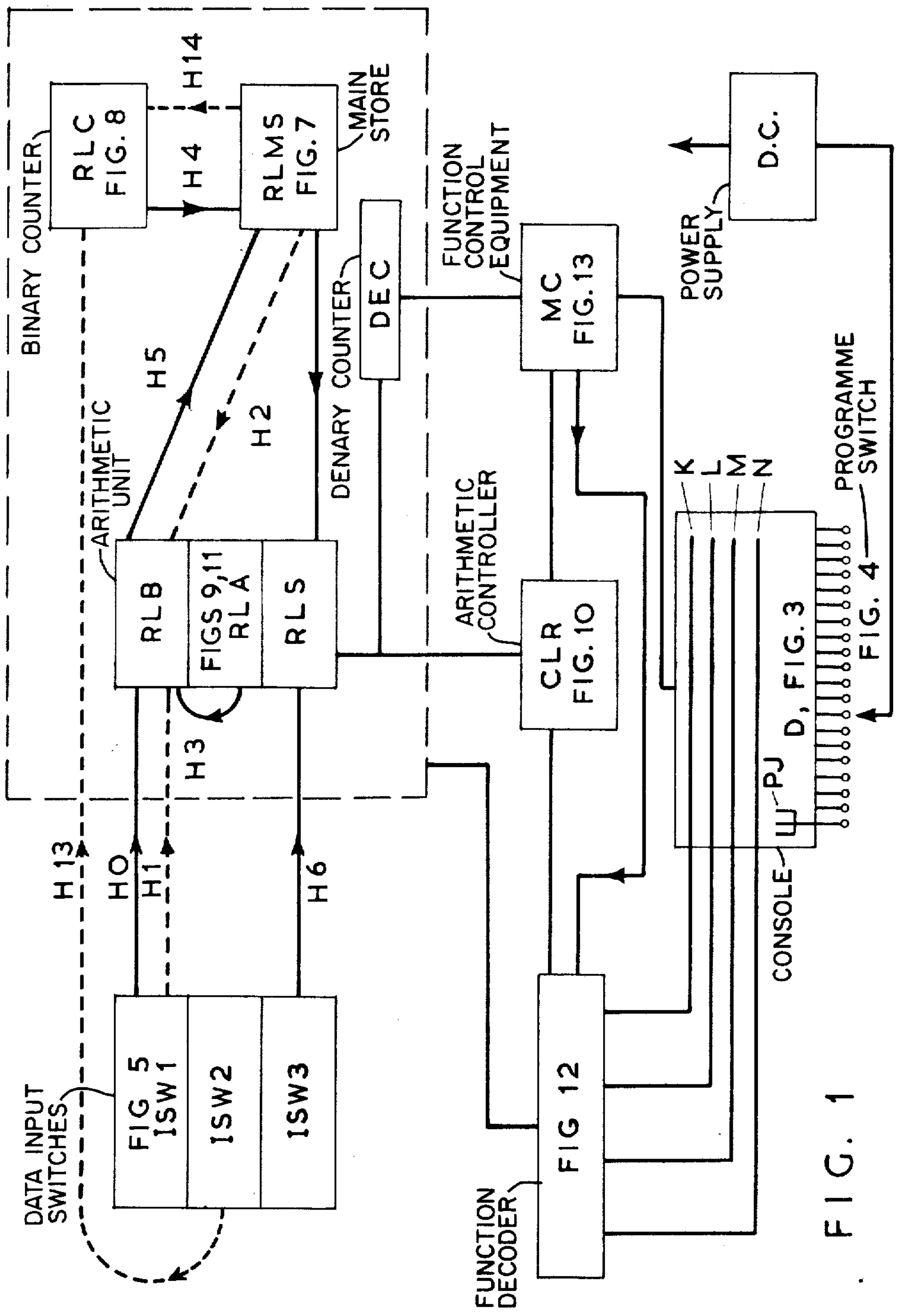
FIG. 1 is a schematic block diagram showing the operational units and their interconnections.
Figure 9:
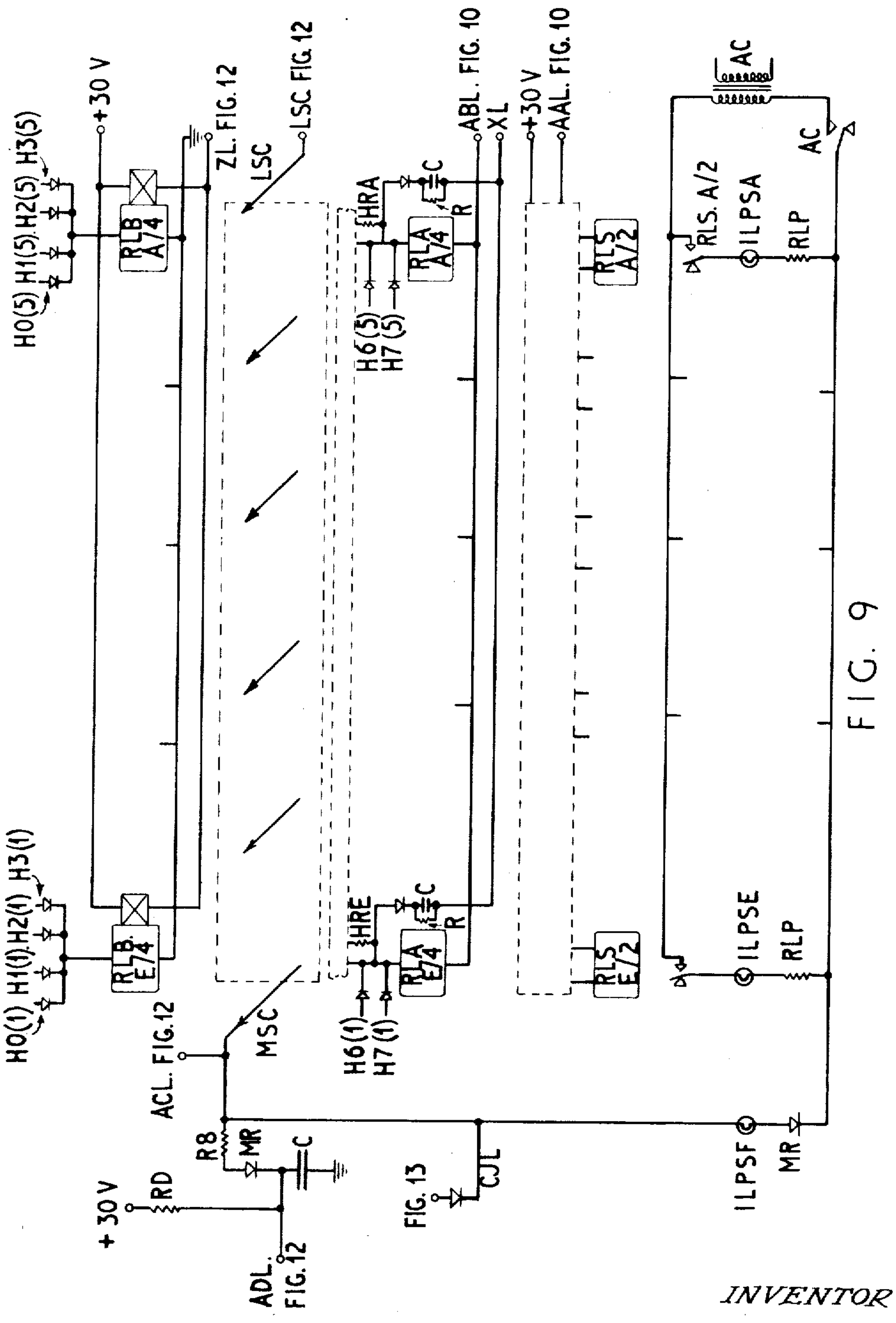
FIG. 9 is a block schematic of the arithmetic unit also, used in my application No. 628,414, filed Apr. 4, 1967.
Figure 11:
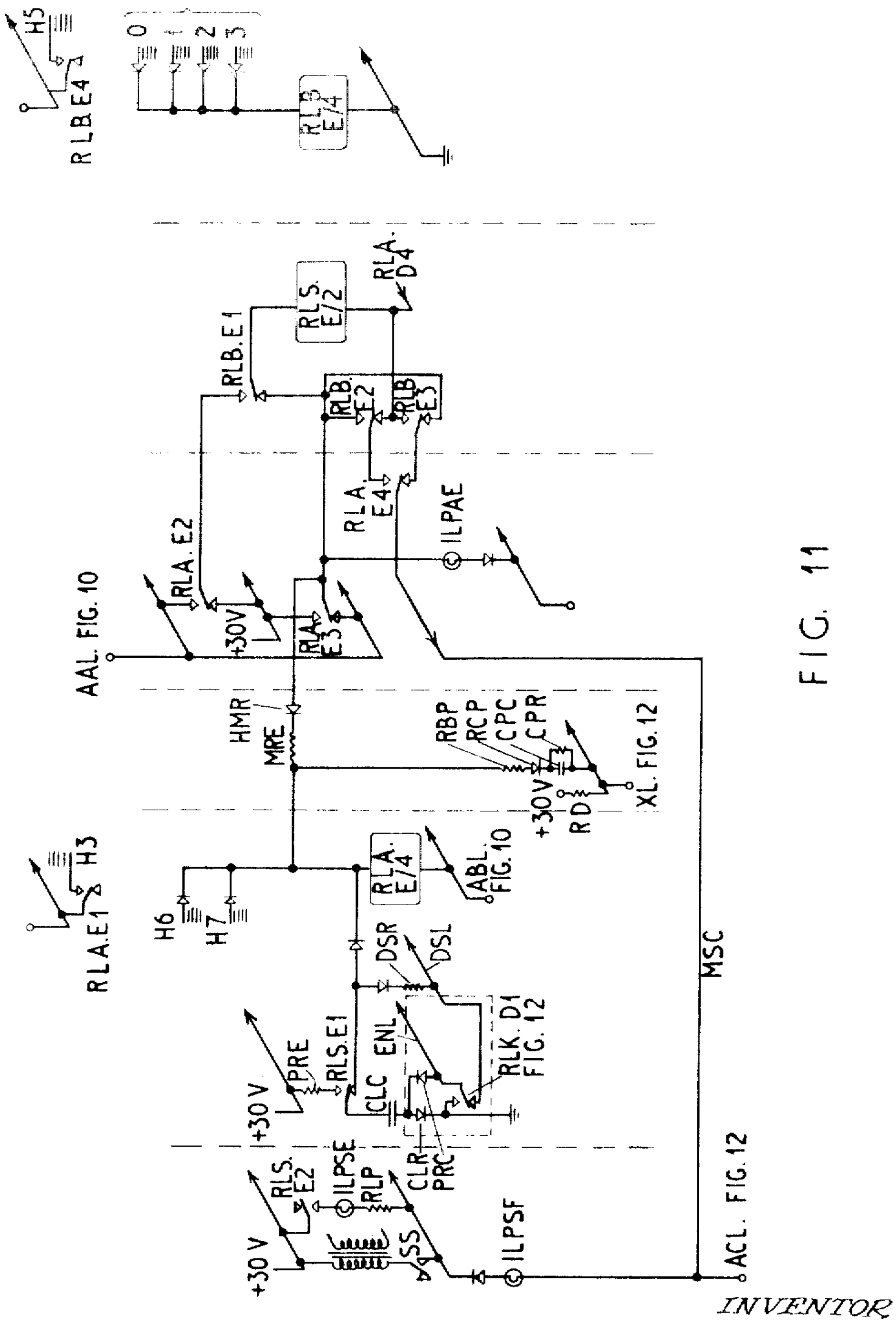
FIG. 11 is the circuit diagram of the arithmetic unit.

FIG. 1 is a schematic layout of the computer, the arithmetic part of which RLA, RLB, RLS, FIGS. 9, 11 and associated circuits, is operationally the same as that described in my aforesaid application, but caters for 5-bit code words instead of 4-bit words, and has its circuitry modified to the extent necessary to cooperate with the computer equipment. Operational data is sent from the Data Input Switches ISW1, 2, 3, FIG. 5, to the computer stores which include the "word" stores RLA, RLB of the Arithmetic Unit FIGS. 9, 11, Main Store RLMS, FIG. 7, and Counter Store RLC which can also be used for temporary storage of Information "words" when required.

Figure 3:
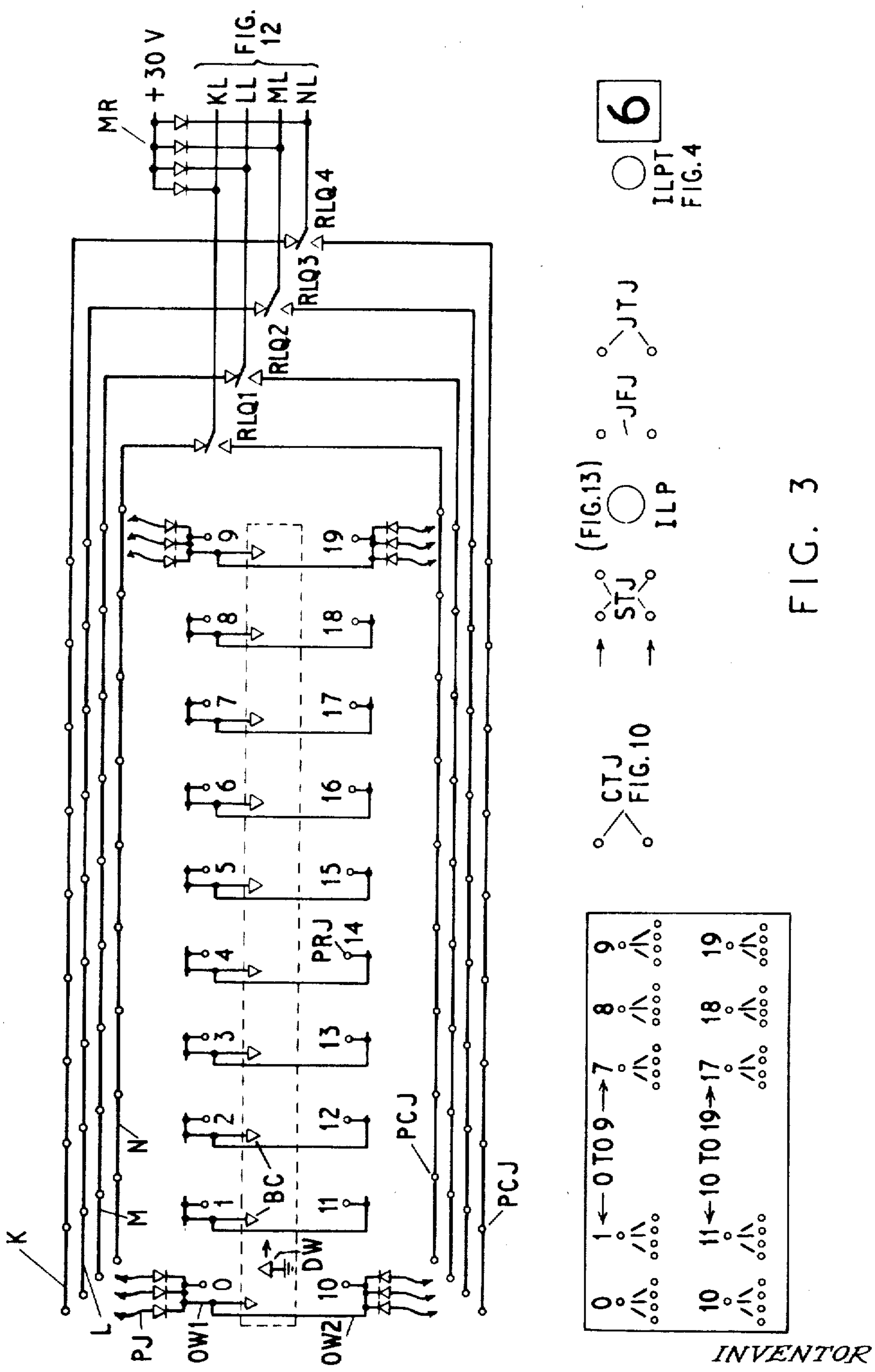
FIG. 3 shows the equipment, circuits, and layout of the machine console.
Figure 4:
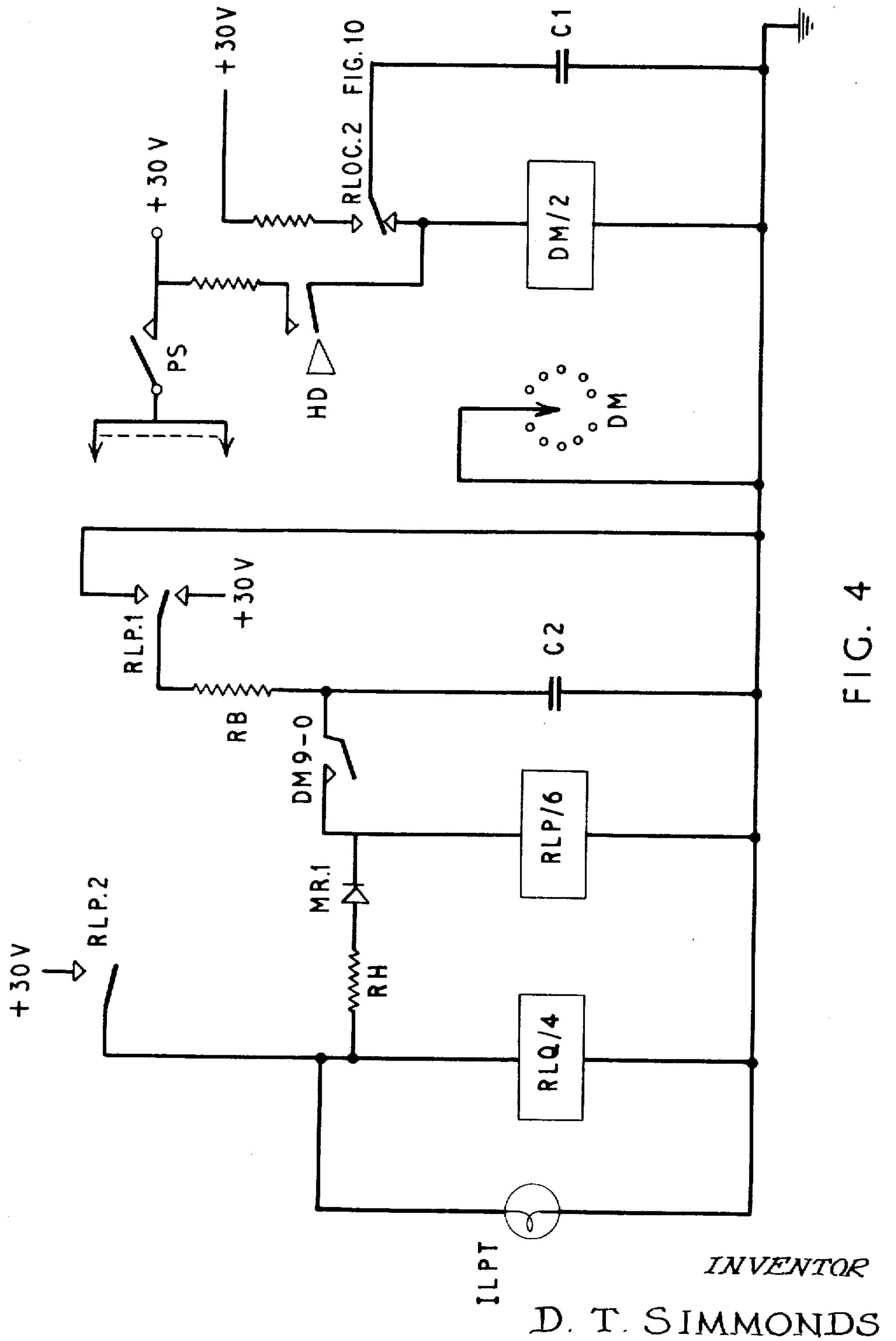
FIG. 4 shows the operational circuits of the programme switch.
Figure 12:
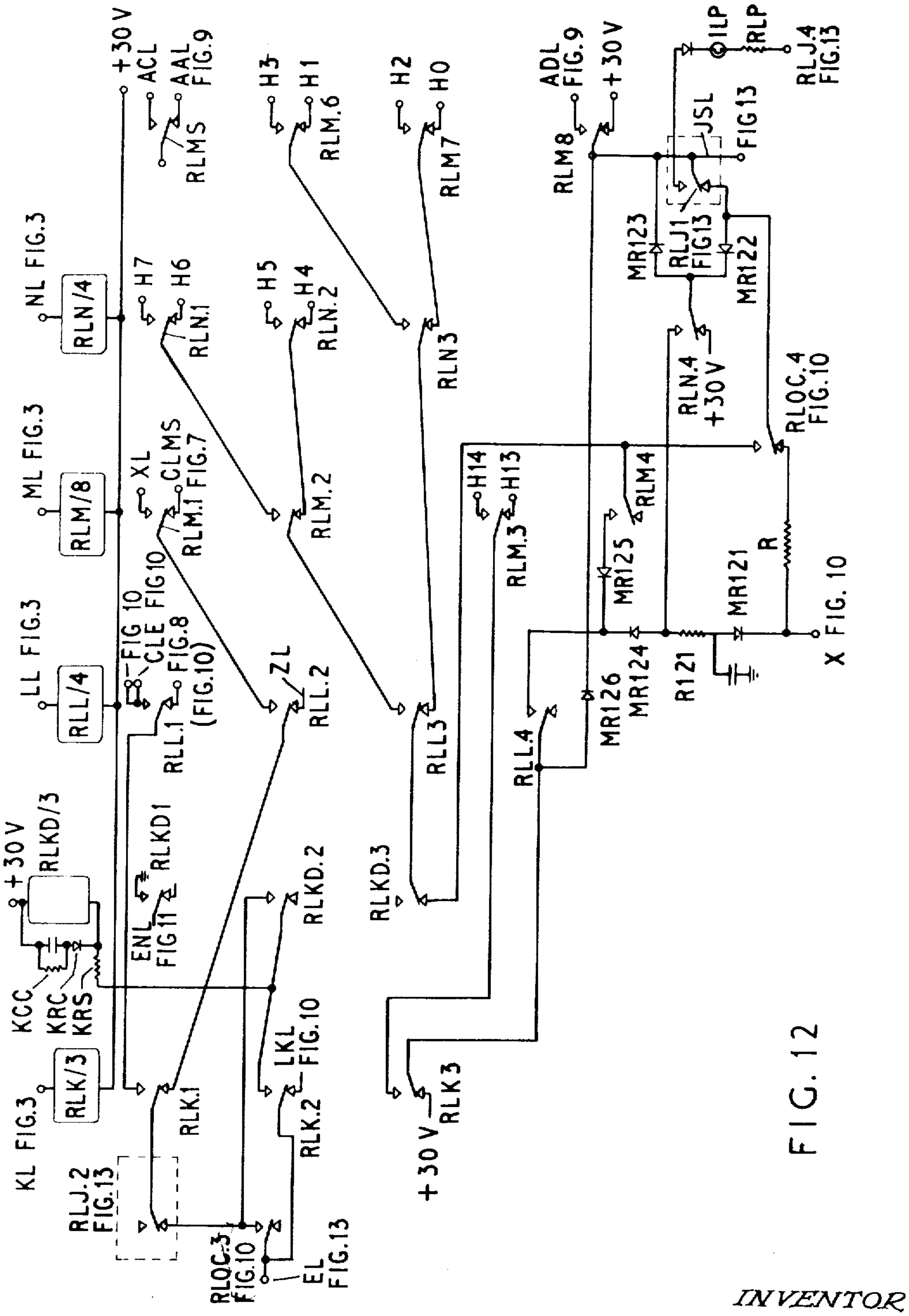

Programmes are set up on the individual contact bank positions, known colloquially as "hubs," of an electro-mechanical step-by-step wiper switch D, FIGS. 3 and 4, by means of individual multipled plugs PJ which can be selectively plugged into individual jack multiples which are commoned by multiple wires K, L, M, N, via which "$x$ (=0 to 3) out of 4" element codes identifying programme functions can be sent to a function decoder, FIG. 12, which determines a required function and instructs the operational equipment of the computer accordingly.

Figure 13:
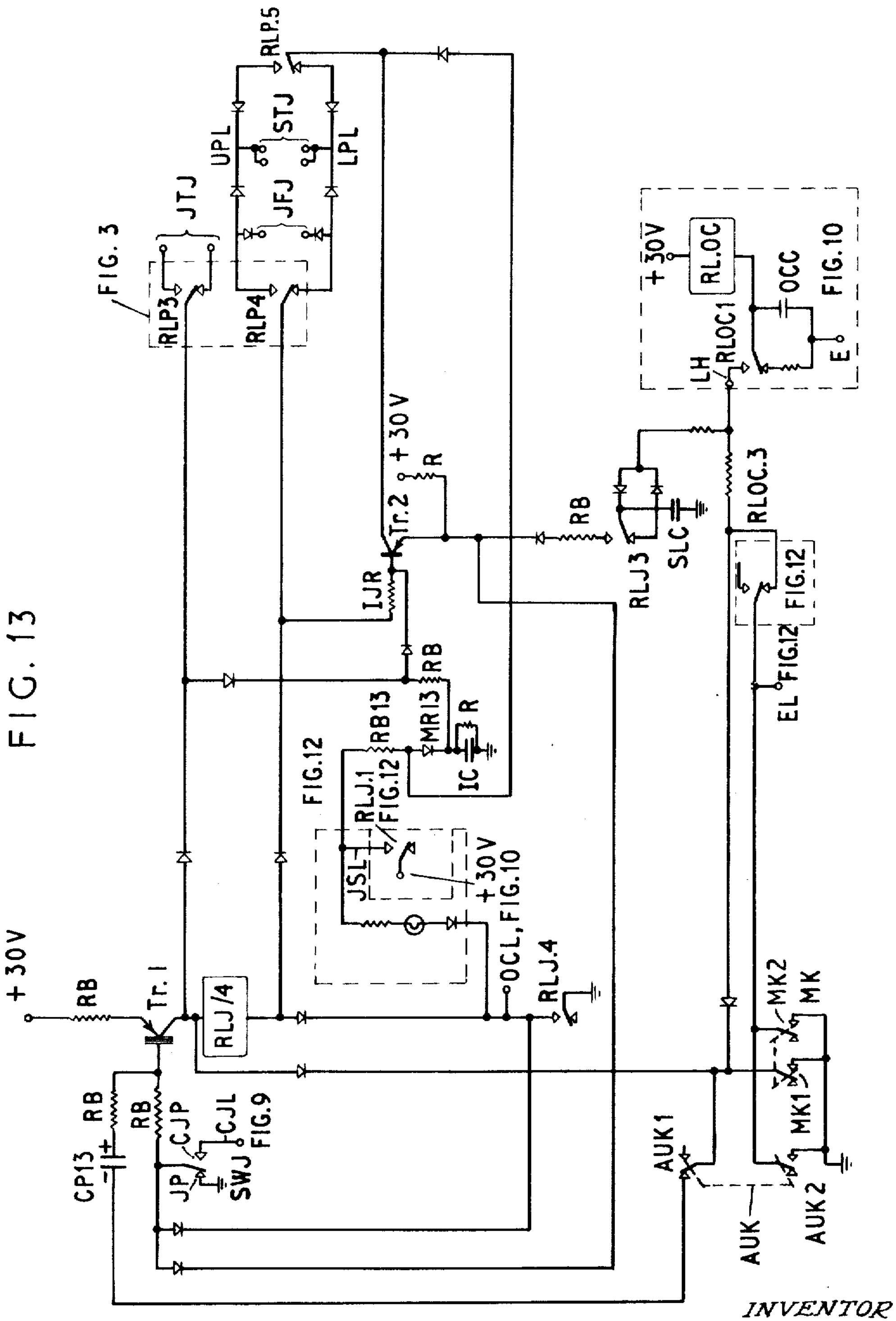
FIG. 13 shows the Jump, Conditional Jump, and Stop control equipment.

The programme switch is controlled by the Manual Control Equipment, FIG. 13, to take one step at a time, or to step automatically, in each case performing any plugged-in function per step; to stop at any desired position ignoring any plugged-up programme thereat; to "jump" between spaced positions or to make any such "jump" conditional on certain results having occurred, ignoring plugged-up functions at the positions passed over. The "jump" and "stop" functions are preset by plug connections to positional jacks, while the individual and automatic stepping are controlled by manual keys.

All the computer functions are carried out in 5-bit binary code and intercommunication between the various operational units of the computer is via a number of 5-wire code signal highways, one for each internal route.

The arithmetic equipment is arranged to perform a fixed sequence of additions in the course of multiplication, this sequence being counted by the counter switch; or to perform a conditional sequence of subtractions for division, the end of which is determined by the change of sign of the remainder. This conditional sequence can be counted and indicated in decimal form by a Denary Counter DEC which visually displays the count. The numbers recorded at any time in the various stores can also be visually recorded on lamp indicators, together with the numbers inserted by the Input Data Switches.

Figure 10:
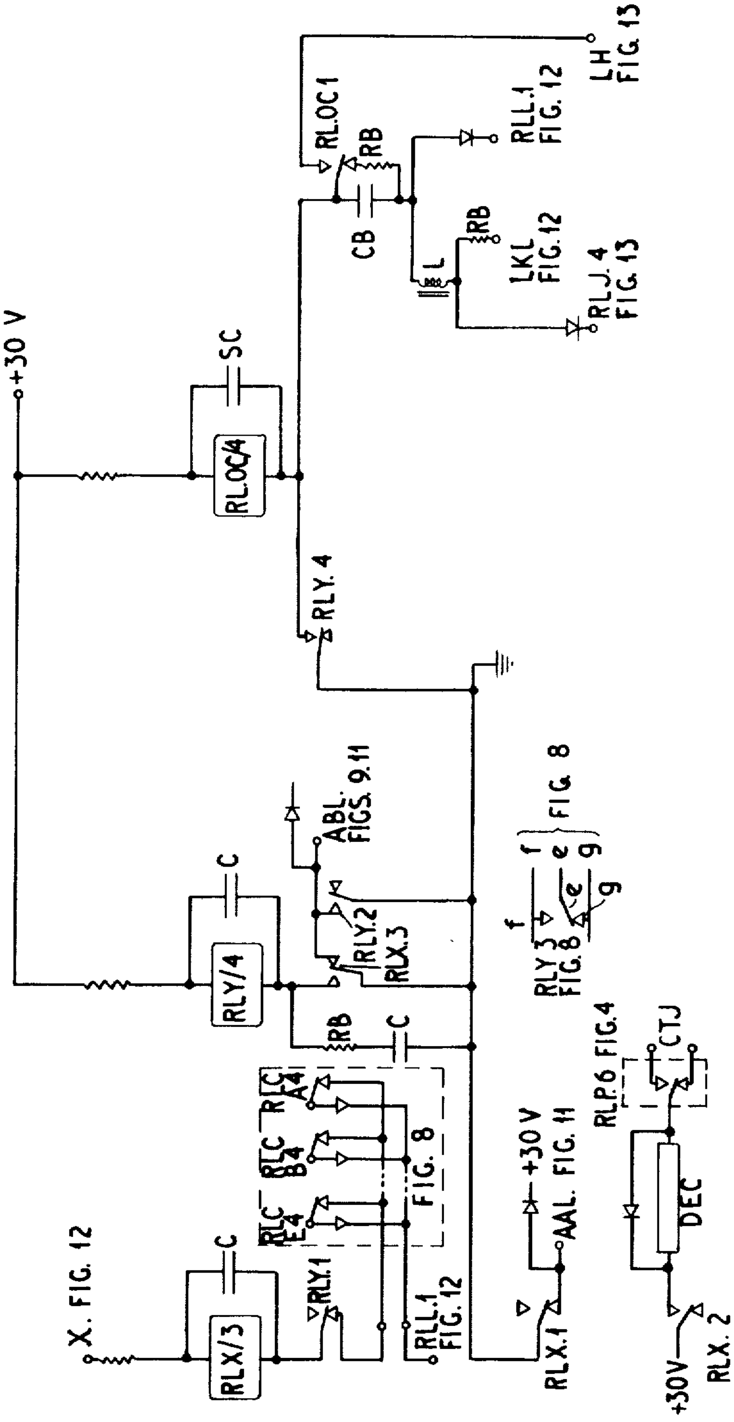
FIG. 10 is the arithmetic controller circuit similar to that shown in my application No. 628,414.

Clear Equipment CLR forms part of FIG. 10 and is used to clear any one or any combination of "word" stores as required.

By suitable programme selection, quite complex mathematical problems can be solved.

The programme panel, FIG. 3, comprises an electromagnetic ten-point rotary-wiper and contact-bank switch D, in which two output wires OW1, 2 are connected to each contact of the wiper bank: e.g. 0 and 10. Each output wire is connected to a set of three individual plugs PJ via blocking diodes, and each wire is also connected to an individual jack 0 . . . 19, to be described later.

On the panel are two arrays of jack-strips, one adjacent each set of wires and each comprising ten individual strips of four jacks PCJ, corresponding jacks in the sets of four being commoned to one of four leads K, L, M, N. The individual leads of the two groups of four leads from the two arrays of jacks are connected respectively to the front and back contacts of four change-over contacts RLQ1 . . . 4 forming the contact pile-up of an electromagnetic light-current D.C. contact-making relay RLQ, FIG. 4, the change-over contacts of which are connected to leads KL . . . NL for electrical binary-code parallel transmission. The leads KL . . . NL are connected to a diode spark-suppression unit MR.

One, two, or all three, of the plugs of any set PJ can be inserted into any 1, 2, or 3 of the respective jack strips. A single rotary wiper DW, shown as a large triangle, which is connected to earth, can be rotated so as to contact in turn the ten bank contacts or hubs BC, shown as small triangles, which are arranged in a circular contact bank. When stepped to any one of its bank contacts BC, the wiper DW connects earth via the plug sets connected thereto, and the jacks or jacks of their jack strips into which one or more of the plugs of the two plug sets PJ have been inserted, to apply corresponding multi-bit code signals to the two lead groups K–N.

According to which plug-strip array is being used, the relay RLQ will be correspondingly operated so that its change-over contacts are in contact with the lead group in use, and the code signals from the corresponding plug set is connected through to the leads KL . . . NL.

To set up a program, a selection; up to 20; of the various plug sets are inserted according to the codes required into their jacks, and the switch will be moved from contact hub to contact hub as the programme develops.

The machine can be caused to run through its programme automatically by manual operation of the Autokey AUK, FIG. 13, as described later.

Alternatively, the programme switch D can be advanced one step at a time under control of Manual key MK, FIG. 13.

The instruction codes to be used are 0–14; 4-element binary code, 0000–1110 (8+4+2+0=14).

None of these codes involve more than three bits, and can be set up with the 3-plug set PJ.

For binary code 0000, none of the four jacks PCJ of a programme hub will be plugged. As will be seen from FIG. 2, code 0 is an instruction to insert a number set up on keys ISW1, FIG. 5, into the RLB Store of the arithmetic unit, FIGS. 9, 11; code 6 is an instruction to insert a number set upon keys ISW3, FIG. 5 into the RLA Store of the arithmetic unit, while code 8 is the ADD instruction. In consequence, to set up a programme, add 1+3, the plug sets PJ of hubs 0, 1, 2 are set up as follows: for hub 0, no plug is inserted into its upper jacks PCJ to indicate code 0; for hub 1, two plugs are inserted in the two middle packs PCJ to set up 0110=6; while for hub 2, one plug only is inserted in the K lead jack to set up code 1000=8.

As shown, switch D, FIG. 3, is at its home position 0 and relay RLQ is deenergised: wiper DW connects earth to multiple plugs PJ of hubs 0 and 10, but only the "0" plugs are operative, since contacts 1–4 of RLQ are connected to the upper sets of leads K–N.

The programme is initiated by turning on the power supply at contact PS, FIG. 4, to apply power to various points in the equipment including the common battery lead to relays RLK–N, FIG. 12. The code applied via hub contact 0, FIG. 3, is now set up on relays RLK–N, FIG. 12. In this case, the multiple plug 0 is not plugged in so that none of relays RLK–N is operated.

Figure 5:
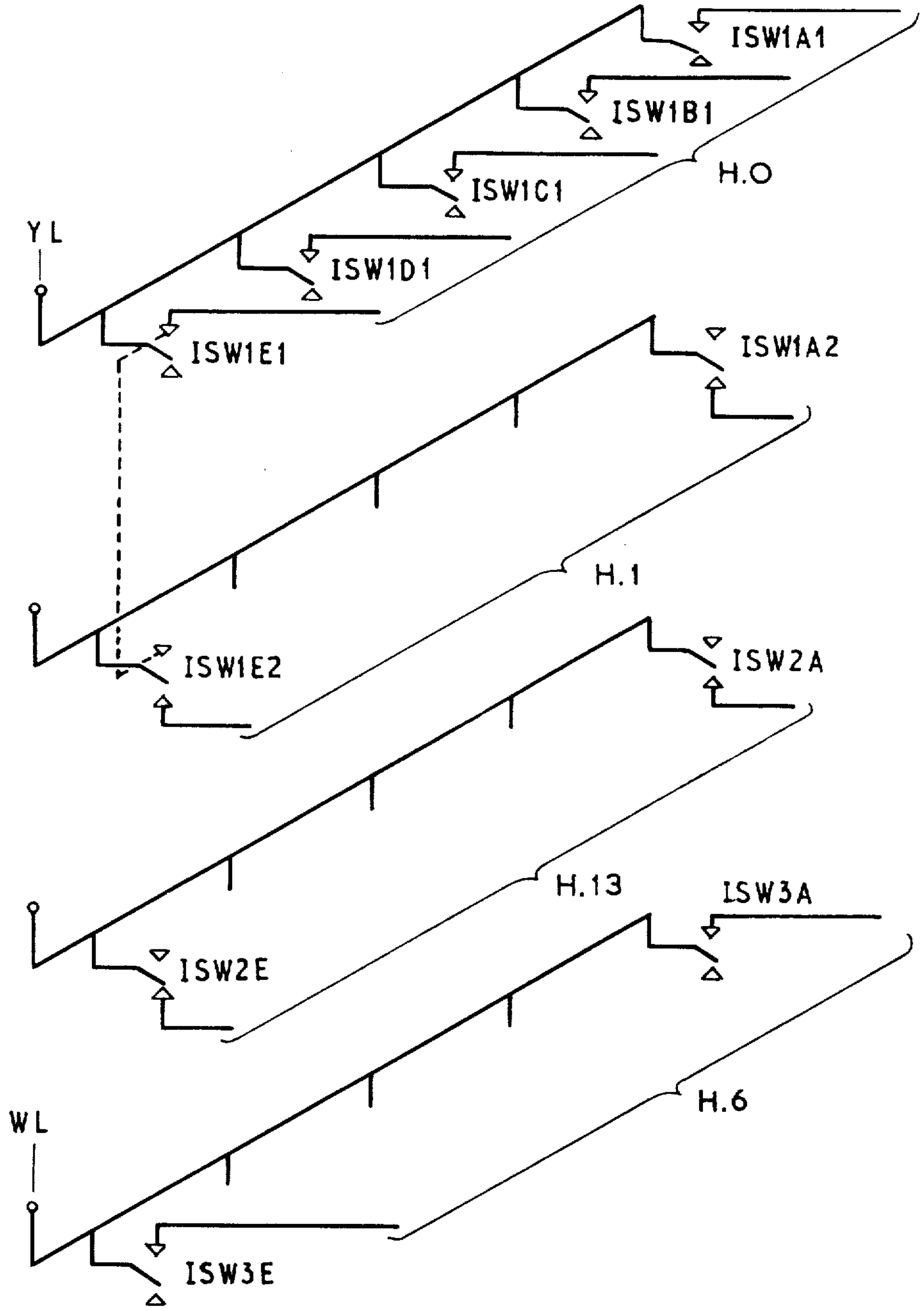
FIG. 5 shows the Data Input Switches.

Number 3 is set up by depressing Input Data Manual Code switches ISW1.A and B, FIG. 5; which are connected via 5-wire highway ZERO to the Arithmetic Unit, FIG. 9, where the respective wires are connected via blocking diodes to storage relays RLB.A and B.

When Manual key MK is depressed, it applies earth via MK2, connection EL to FIG. 12, RLK2 and lead KL to FIG. 10, resistor RB, delay inductance L, capacitor CB, in parallel with a resistor and back contacts RLOC1, relay RLOC, to battery. As a result, RLOC (which is shown both in FIG. 10 and FIG. 13) operates and is held via MK1, FIG. 13, RLOC1. The function of RLOC is to step the programme switch by pulsing its magnet DM shown in FIG. 4 by means of a capacitor C1 which is now charged via front contacts RLOC2. However, as manual control is in operation, and RLOC is locked, the programme switch will not be stepped until manual key MK is released to unlock RLOC, the release of which connects C1 across magnet DM to operate DM momentarily. On release, DM steps the programme switch to its contacts 1, 11, FIG. 3.

While MK was closed and RLOC was energised, earth via EL, from FIG. 13 to FIG. 12 is connected via front contacts RLOC3, back contacts RLJ2, RLK1, RLL2, via lead ZL to the common CLEAR connection FIG. 9, for the RLB store, which is cleared of any existing contents in readiness to receive digit 3.

At the same time, battery via back contacts RLMB4, RLJ1, FIG. 12, front contacts RLOC4, and a series of back contacts of the function decoder relays, and lead YL to FIG. 5 is connected in multiple to the Input Data Switches ISW1, A to E of which A and B are operated, so that battery via the respective leads of highway ZERO energise storage relays RLB.A and B to store digit 3.

The multiple plug at programme position 1, FIG. 3, is plugged into its two middle jacks, so that function decoder relays RLL and RLM are now energised. The number 1=0001 is set up on Input Data Switches ISW3, FIG. 5.

Key MK is now depressed and RLOC operates as before, and locks up.

The arithmetic unit store RLA which is to receive digit 1 has to be cleared (in the same way that RLB was cleared) for use in programme 6. It will be seen from FIG. 2, that store RLA must be made available to receive a new number in relation to programmes 6 and 7 only, and circuits based thereon extend from contact RLOC3 via the respective front and back contacts of the function decoder relays to lead XL, which is connected to the common CLEAR LEAD for the relay RLA, FIG. 9.

As for inserting digit 3, battery via RLOC4, FIG. 12, back contacts RLKD3; front contacts RLL3, RLM2; back contacts RLN1; lead WL; Input Switches ISW3, FIG. 5, lead 1 of Highway 6 to energise RLA.A, FIG. 9, only.

As before, the programme switch is given a further step to contact or hub 2, which is plugged for code 8 (binary 1000), so that relays K and KD, FIG. 12, are operated.

Relay RLX, FIG. 10, is now operated as follows. Earth from EL via RLK2 front, FIG. 12, RLKD2 front, RLJ2 back, RLK1 front, RLL1 back, via binary counter signalling contacts, FIG. 8, contacts RLY1 back, FIG. 10, relay RLX terminal *x* FIGS. 10 and 12, RLOC4 back, RLJ1 back, RLM8 back, battery RLX in the Controller operates followed by RLY, which in turn operates RLOC, FIG. 10. RLOC removes battery from RLX at RLOC4, so that the Controller performs a single "ADD" operation. RLX and RLY release in turn, but RLOC holds RLOC1 via manual switch MK1, release of which releases RLOC and steps the programme switch to position 3.

As a result, the members 3 and 1 are added and the sum 4 is stored on the relays RLA as described in my aforesaid application.

This completes the programme, none of the other programme hubs having been plugged in. To home the programme switch in such conditions, a home-drive press key HD, FIG. 3, is repeatedly operated to operate magnet DM to home the switch or to step it to any other desired position for another programme.

To use the complete programme facilities of up to 15 programme functions distributed around the 20 switch positions, it is necessary to switch from hubs 0–9 to hubs 10–19 and back after alternate revolutions. This is controlled by a make-and-break pair of contacts DM2, FIG. 4, on the programme switch which are physically located between wiper contacts 9 and 0, so as to be momentarily closed at each revolution of the wiper.

When power is switched on, battery on RLP1. FIG. 4, charges capacitor C2 via a small resistor RB. When contacts DM2 are operated at the end of a first revolution of the switch, capacitor C2 discharges through DM2 closed and relay RLP, which operates and locks via diode MR1 and locking contacts RLP2, to battery, which also operates relay RLQ and Tens lamp ILPT, which indicates that the second half of the programme sequence is in operation due to the change-over of contacts RLQ1–4, FIG. 3.

The next time that contacts DM2 are closed, the connection of the short-circuit via DM2 and the discharged capacitor C2 deenergises RLP which releases and in turn drops off RLQ by the opening of contacts RLP2.

For automatic programme stepping, the Auto-key AUK, FIG. 13 is used. When thrown, AUK2 supplies earth to EL, FIG. 12, only, as distinct from MK which also connected earth to lock RLOC via RLOC1.

It will be remembered that earth via lead EL, FIG. 13, from key contacts MK2 as described above, or from AUK2 for automatic stepping of the programme switch which is now being described, is connected via contacts RLK2 back, FIG. 12, in the function decoder, resistor RE FIG. 10, resistor-capacitor coupling CB, RB, relay RLOC to battery. Relay RLOC is energised and changes over its contacts RLOC1. Capacitor CB is then charged, after which operating current for RLOC ceases. Parallel capacitor SC renders ROLC slow-to-release to provide an opportunity for the relay to be re-energised via RLY4, FIG. 10, for example.

As previously stated, the programme switch steps on release of RLOC. The "operate" period of RLOC covers the time required for each function, other than "multiply" and "divide," which are repetitive operations, so that apart from these two functions, with key AUK depressed, relay RLOC will alternately operate and release, and step the programme switch each time it releases.

As described with reference to my aforesaid application No. 628,414, "multiply" and "divide" operations are controlled by the flip-flop sequence of relays RLX, RLY, FIG. 10, of the arithmetic controller circuit. Each time RLY operates and releases, RLOC is pulsed via RLY4 and is thus maintained operated throughout the duration of the "multiply" or "divide" function.

As previously stated, Automatic Operation Key AUK, FIG. 13 provides earth to point EL, FIGS. 13 and 12, but does not, like MK, provide a "hold" earth to RLOC1 via MK1. FIG. 13. RLOC is therefore caused to operate momentarily and release, advancing the wiper D to the next hub on nonarithmetic instruction codes 0–7 and 12, 13, 14. This is achieved through provision of earth to one or other of two points, namely, RLL1 front and RLK2 back, from FIG. 12 to FIG. 10, both of which supply a pulse of current through the capacitor-resistor coupling CB, RB associated with contacts RLOC1, FIG. 10. Highways 0 to 7 inclusive, utilised by instruction codes 0 to 7, use RLK2 back, while Highways 12, 13, 14 (codes 12, 13, 14) use RLL1 front.

Codes 8–11, used for the arithmetic functions, are differentiated from all other functions by incorporating "binary 8" (different from codes 0–7), and by not incorporating "binary 4" (different from codes 12, 13, 14). Thus, the arithmetic functions are characterised by RLK and RLKD FIG. 12 being operated with RLL FIG. 12 not being operated: in these circumstances, RLOC FIG. 10 is not energised as before. During arithmetic operations, codes 8, 9, 10, 11, RLX, FIG. 10 is supplied with power and together with RLY FIG. 10 acts to control the operation of the arithmetic unit. Additionally, each time RLY.4 front contact momentarily closes, FIG. 10, it operates RLOC. If a single arithmetic operation is called for, in codes 8 for "add" or 10 for "substract," RLX is allowed to make only one operation, since RLOC4 FIG. 12, removes power from the controller as soon as RLOC has operated. When RLOC then falls, it steps the wiper D to the next hub. If a multiple arithmetic operation is called for; in code 9 for "multiply" or 11 for "divide," RLX is allowed to make repeated operations by providing it with an alternative power supply not controlled by RLOC4. In this case, RLOC is kept operated until the whole sequence of arithmetic unit cycles is completed, by RLY4 FIG. 10 momentarily operating RLOC during each arithmetic cycle, while RLOC is made slow to release by a capacitor in parallel with its coil. Otherwise, the arithmetic operations are as described in my aforesaid application.

If the programme described above on a "one step at a time" basis were carried out automatically, in order to step the machine at hub 3, a double-ended plug lead would be used to connect jack PRJ3 on the programme panel FIG. 3, to the corresponding one of the stop jacks STJ on the control panel FIGS. 3 and 13.

When earth is supplied by wiper DW at hubs 3 and 13, it is conducted via diodes and contacts RLP4 and 5 to supply earth to both the base and collector of T*r*2, FIG. 13. The insertion of the RLP contacts arranges that the connection at hub 3 is effective, but the parallel connection when the wiper is operating programme step 13 is not effective.

The machine is then stopped as follows.

T*r*2 now conducts, and applies earth via its emitter to the base of T*r*1, enabling this to connect battery via its emitter and collector to operate KLJ to the earth supplied via RLP.4 as above.

RLJ.4 front contact holds RLJ operated and operates RLOC which is held by earth from the emitter of T*r*2, RLJ.3 front, to RLOC1 front to hold the programme switch from stepping.

The change-over of contacts RLJ1 and 2 FIG. 12 removes battery and earth connections from the function decoder circuit so that any programme instruction plugged at this hub is ignored.

At the same time, RLJ1 front contact lights a "stopped" lamp, ILP, to earth on RLJ4 FIG. 13.

The operation of RLJ1 connects battery, to one end of RB13, but earth from RLP5 is applied at the other end of RB13, via MR13, so that no battery potential can get towards the base of T*r*2 to inhibit conductance by T*r*2.

To remove the stop condition, AUK is first released, without immediate effect. Manual key MK is now operated, when earth supplied via MK1 front contact short-circuits RLJ, causing it to release. The removal of earth by the release of contacts RLJ3 is replaced by earth from MK1 front contacts, to hold relay RLOC.

Capacitor CP13, FIG. 13 charges to battery potential via T*r*1, emitter and base, and when Key MK is released, contacts AUK1 connect battery via T*r*1 emitter and collector to capacitor CP13 so that it now discharges, sending a pulse of current into the base of T*r*1, momentarily inhibiting its conductance.

This prevents RLJ from being re-set by earth supplied by the stop connection, through RLP4.

The release of key MK also removes earth from point LH, so that relay RLOC releases stepping the wiper D onto the next hub, and removing the earth supplied via the stop lead.

A "Jump-From" instruction is arranged by using a double-ended plug lead to connect any desired hub to the correct one of two "Jump-From" jacks JFJ on the control panel, for hubs 0 to 9 and 10 to 19, respectively.

These jacks are also shown on FIG. 13 and it will be seen that they supply earth via RIP4 (to discriminate between the two rows of hubs) that *MAY* operate RLJ via a connection to battery made through T*r*1.

A "Jump-From" signal is distinguished from a "stop" signal by the fact that it appears only on RLP4 contacts, when its hub is energised, not on *both* RLP4 and RLP5 contacts, since the diodes in the leads UPL, LPL block earth via the Jump plugs.

With the conditional jump switch SWJ FIG. 13 is on its Jump contact JP, it supplies earth to the base of transistor T*r*1, ensuring its conduction, so that a "Jump-From" signal coming from contacts RLP4 operates relay RLJ, which holds to earth on RLJ4 and supplies earth via lead OCL, to cause RLOC FIG. 10 to operate and release continuously, stepping the programme switch D, FIG. 3. During stepping of the wiper switch, which may last for nearly two revolutions of the wiper, contacts RLJ1, bottom right, FIG. 12, and RLJ2, top left, open-circuit battery and earth connections respectively in the function decoder, FIG. 12, so that all programme instructions plugged at the hubs which are passed over, are ignored during the stepping operation.

To show that jumping or stepping is taking place instead of functional normal machine operation, the "stopped" lamp, ILP, is lighted during jumps, by a circuit earth RLJ4 front, FIG. 13, ILP, RLJ1 front, to battery on RLM8 back.

The machine must also jump past a "stop" instruction, which it would normally obey if it were not jumping, a feature which is arranged using contacts RLJ1.

As soon as a jump is initiated, by operating RLJ, the front contacts of RLJ1 connect battery via resistor coupling RB13, MR13 to capacitor IC which charges rapidly to battery potential, and raises the potential on the base of T*r*2, so as to inhibit conduction in this transistor.

When a STOP instruction is encountered during a Jump, the earth supplied via the STOP jack, RLP4 and series resistor IJR to the base of T*r*2, cannot, with capacitor IC charged, make this base sufficiently negative to allow T*r*2 to conduct, so that no Hold current can flow via T*r*2 emitter, through RLJ3 front contacts, to RLOC1 front contacts. At the same time, the earth connection routed from the STOP jack via RLP5 to the junction of RB13 and MR13 can not discharge capacitor IC, because of the potential conditions of MR13, although on a normal STOP instruction, this earth connection prevents the build up of a charge on IC, as explained in relation to the STOP feature. Thus a STOP instruction is obeyed unless it is encountered during a Jump when it is ignored like all other instructions except Jump-To, which will now be explained, and which terminates the JUMP stepping operation. For Jump-To the respective plugs of a double-ended plug lead are inserted in the numbered jack at the desired hub to the correct one of two Jump-To jacks JTJ on the control panel, used for hubs 0 to 9 and 10 to 19 respectively. The Jump-To instruction causes the machine to stop automatic stepping when it reaches the plugged hub, and then proceeds to follow program instructions from there on, beginning with the instruction plugged between the programmed jack PRJ FIG. 3 of the chosen hub and three of its four code jacks PCJ as indicated for example for a hub "0."

The two Jump-To jacks on the control panel, FIGS. 3 and 13 supply earth from DW, FIG. 3 via RLP3, FIG. 13 (to discriminate between the two rows of hubs), to short-circuit relay RLJ causing it to release: . . . shorting the coil avoids high dissipation in T*r*1 during release of RLJ.

The RLP3 contacts also supply earth to discharge capacitor IC rapidly, so that next time that a STOP instruction is encountered, T*r*2 is not held in an inhibited state by IC charged, so that the STOP instruction can be effective.

The manual switch SWJ FIG. 13 is normally on its contact JP in which the automatic JUMP arrangements described above under control of jacks JFJ and JTJ occur. When switch SWJ is changed over to its Conditional Jump contact CJP, a Jump-From signal will only be able to operate RLJ to cause a jump to start, provided transistor T*r*1 has not been rendered inoperative.

In the Conditional Jump mode of machine operation, T*r*1 is only switched conducting if the "most significant Carry" out of the arithmetic unit, FIG. 9, is at earth potential, this earth then being applied to the base of T*r*1 by the switch SWJ on its contact CJP.

During subtraction, the lack of battery potential at the "most significant Carry" MSC of the Arithmetic Unit indicates the existence of a negative result, so that a negative result from a subtraction sum is one example of a condition in response to which the machine will jump when in the Conditional Jump condition.

When the switch SWJ is in position CJP, T*r*1 must be held conducting by supplying a definite earth connection to its base whenever it is desired to operated RLJ, in case the CJL lead from FIG. 9 is not providing such an earth connection.

During a Jump, this earth connection is supplied by RLJ4 front contacts. When a STOP signal is encountered, this earth connection is supplied from the emitter of T*r*2.

Contacts RLJ3 FIG. 13 have two uses: firstly, for the STOP function, the earth to hold RLOC operated via RLOC1 front contacts is supplied through RLJ3 front contacts. The release of relay RLJ then removes this hold on RLOC, allowing it to release, so that it steps the wiper D. Thus release of RLJ is used to remove the STOP condition of the machine; secondly, RLJ3 has a capacitor SLC attached to its change-over contact, that is effectively connected to RLOC1 front contacts. Each time relay RLOC operates, the complete charging of the capacitor OCC associated with the change-over contact RLOC1 is delayed, because it shares its charge with the capacitor SLC associated with RLJ3. The effect of this is to give a suitably slow stepping action of RLOC and programme switch D during normal use. However, during a JUMP, RLJ3 back contacts are no longer closed, so that the associated capacitor SLC can charge, but not discharge. The effect of this is to speed up the stepping action of switch D during Jumps.

Earth from the RLOC operating circuit, FIG. 10, via lead KL, FIG. 12, RLK2 back, lead EL to FIG. 13, passes via back contacts RLOC3 to discharge the capacitor SLC associated with RLJ3, each time that relay RLOC releases during normal operation, that is except during Jumps.

The Arithmetic Unit, FIGS. 9 and 11 has binary relay code stores RLAAE.; RLBA. RLEAE with interconnections to form a binary sum on code store RLSA . . . E, as in application No. 628,414, except that each store contains 5 relays instead of 4, and so handles 5-bit codes instead of 4-bit codes. This type of educational computer is not capable of handling long "words," but this is immaterial since the basic principles do not change with capacity. Indicator lamps. ILPA and ILPS are arranged exactly as in my aforesaid application, and AAL, ABL, ACL, ADL, and LSC; the "least significant Carry" lead; have the same functions. The "Most Significant Carrylead MSC is taken out, additionally to FIG. 13—*Tr*1 base for Conditional Jump. Functionally the arithmetic unit is the same as that described in my aforesaid application, but there are certain operational differences as follows.

(I) The RLB store is operated by battery connections transmitted along 5-wire highways H0, H1, H2, H3, FIG. 9, instead of directly via manual input switches. The RLB relays are mechanically locked, and are released when necessary by applying earth to a common connection, which supplies battery to operate all their release windings. An electrical hold may be used, with release equipment as described below for the relays RLA.

(II) The RLA store is operable by battery connections transmitted along highways H6 or H7, FIG. 9, instead of via the denary-to-binary diode encoding matrix, as described in my aforesaid application, which may also be provided as an auxiliary input. Each relay RLA has a protective resistor RBP, a metal rectifier RCP, and a capacitor CPC with a parallel slow-discharging resistor CPR connected from the battery side of its coil to a common clear connection XL, FIG. 12. All the relays RLA can then be released when necessary, by applying earth to XL, which connects its capacitor CPC in discharged condition across each relay RLA which is connected to battery via a hold resistor HRE and diode HMR.

(III) Contacts 1 of the RLA relays form the start of highway H3, while contacts 4 of the RLB relays form the start of highway H5. In my aforesaid application, contacts RLA1, A to E, were used for electrical holds, but an electrical hold circuit for each relay RLA is now provided; via a hold resistor HRE and metal rectifier HMR to the relay contacts 3, which were already part of the adder circuit, thus freeing contacts 1 of the RLA relays to form part of the highway H3.

(IV) Each storage capacitor, CLC FIG. 11, has an individual metal rectifier CLR joining one side of it to earth. Each such metal rectifier CLR has another individual metal rectifier PRC joined to one side of it, and to a common "enable" connection ENL, and there is an individual discharge resistor DSR connected to a common "discharge" connection DSL. Contacts RLKD1 FIG. 12 of the function decoder are included in the circuit to vary the connections between the earth connection to CLR, and leads ENL, DSL as required by the operative function at any time; for instance, to prevent discharge of the storage capacitors, and enable their use to operate relays RLB whenever an arithmetic code, 8, 9, 10, or 11, is used with the function decoder unit, FIG. 12, and relay RLKD is thereby operated.

The controller, FIG. 10, has relays RLX, RLY which control the operation of the arithmetic unit by varying the earth connections from points AAL, ABL FIGS. 9, 10, 11, in a properly phased sequence, as in my aforesaid application. An additional slow-to-release relay RLOC is provided, and contacts RLY4 operate RLOC, during arithmetic operations, to signal "operation complete" after a single or multiple operation of the controller relays RLX and RLY, by releasing and stepping the wiper switch D, FIG. 3.

Other differences between the controller unit of this application and my aforesaid application are:

(I) Battery connection to point *x*, FIGS. 10 and 12, for operation of RLX, is provided by the function decoder, FIG. 12, only when necessary for an arithmetic function to be performed. Instruction code 11, for "divide," provides power from point ADL, FIGS. 9 and 12, via RLM8 front, RLJ1 back, MR122, RLN4 front, R121, MR121, via point *x*, to RLX, FIG. 10 (code relays RLN, RLM, RLK being energised by code 11). This connection is removed at the end of a division process, so that division stops automatically, as in my aforesaid application. The instruction codes 8, 9, and 10 provide battery connection to point *x*, FIGS. 10 and 12, so that addition, multiplication, and subtraction, can all take place without restriction, possibly over-filling the store RLS, or producing negative results in it. This is desirable to show that a computer can present an incorrect result.

(II) The earth connection underneath RLX is provided from EL, FIGS. 13, 12, via RLOC3 front, RLJ2 back, RLK1 front, and RLL1 back, during, and only during arithmetic instruction codes 8, 9, 10 and 11 (characterised by RLK and RLKD(8) operated, with RLL(4) released). Which of these four possible arithmetic operations occurs is therefore described solely by circuitry affecting the battery supply at point *x*, FIGS. 10 and 12, and set up by the function decoder, FIG. 12.

(III) The denary electromagnetic counter, DEC, intended for counting the number of operations made by the controller, is not permanently connected in this case. Contacts RLX2 switch battery (not earth as in my aforesaid application), which operates DEC, only if a circuit is completed to earth: when it is desired that DEC shall operate at a given hub it is arranged that the desired hub shall provide the necessary earth connection when this hub is energised. This is done by using a double-ended plug lead to connect any desired hub to the correct one of two Counter jacks CTJ on the control panel, for hubs 0 to 9 or 10 to 19.

These jacks are also shown in FIG. 10, and it will be seen that they supply earth via RLP6 from FIG. 4 (to discriminate between the two rows of hubs) to operate DEC.

Figure 8:
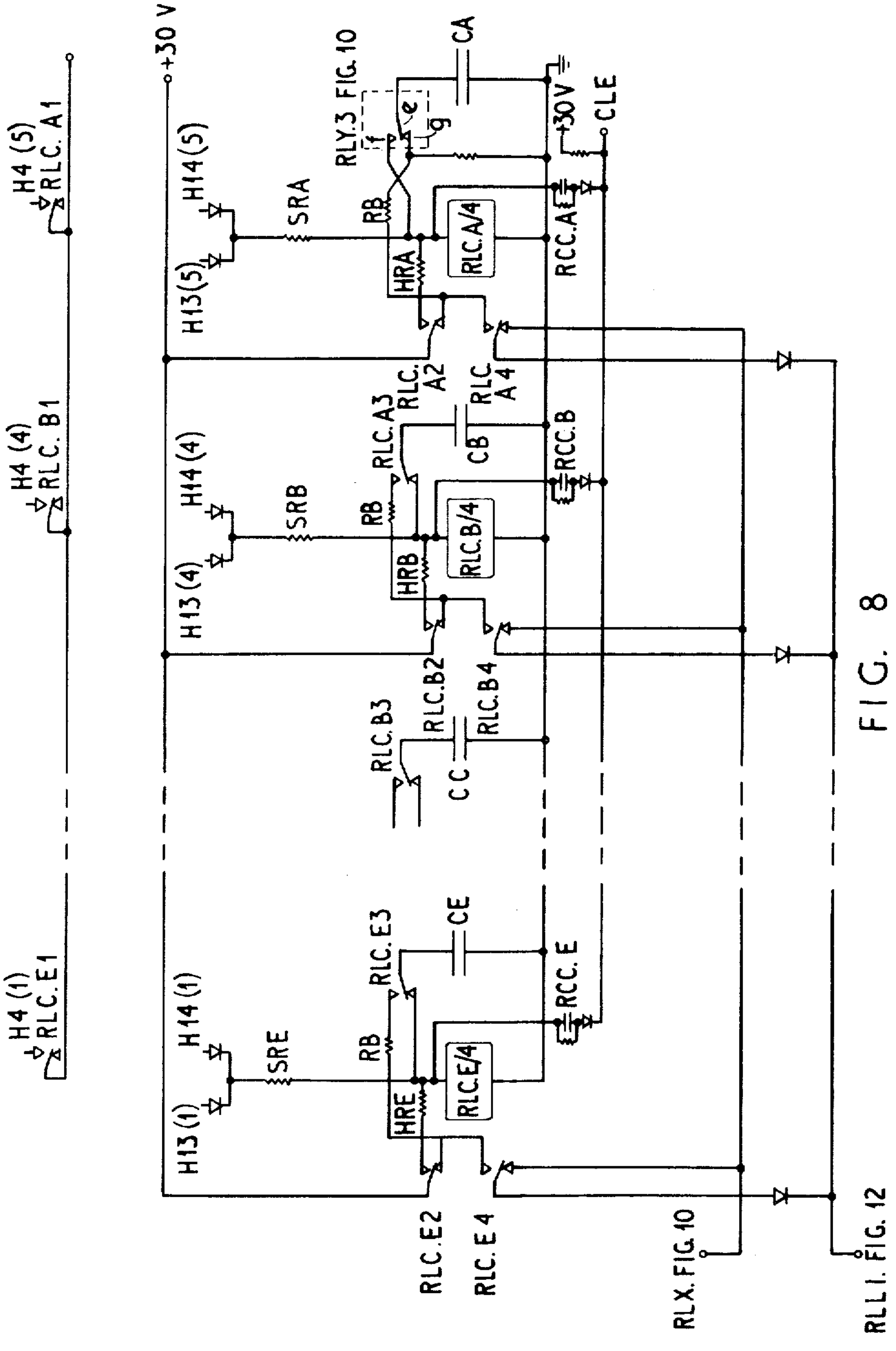
FIG. 8 shows the binary relay counter store used for counting the operations during multiplication, and also available as a store.

The binary relay signalling counter, FIG. 8, operates like the similar counter in my aforesaid application, to stop the action of the controller, FIG. 10, by removing earth from RLX when the parallel signalling contacts 4 of the RLC relays FIG. 8, no longer provide a connection. This is used, just as in the previous application, for multiplication, by setting relays RLC, A to E, with the negation of a number to be multiplied, (for example, 31–N) so that N operations of RLX, FIG. 10, will increase the count stored on relays RLC to 31, and then stop further operation of RLX.

The differences between the counter units of this application and of my aforesaid application are as follows:

(I) Relays RLC, A to E, are operated as required by battery connections transmitted along 5-wire code highways 13, or 14, from FIG. 6, when these are energised, instead of via input switches and a "Clear and Set" switch.

(II) Highway 13 begins on input data switches ISW2A to E, FIG. 5, which provide a negation of N signal when they are set with a number N, but this setting signal is not used until the instruction code 13 is given.

(III) Highway 14 similarly provides a negated 5-bit signal from the contacts of relays RLMS, A to E, when this highway is energised.

(IV) The hold resistors HRA to E, for relays RLCA to E, FIG. 8, are taken to RLC2A to E, to free contacts RLC1A to E.

(V) Contacts RLC1A to E, now provide the start of 5-bit highway 4.

(VI) Each relay RLC has a metal rectifier in series with a resistor-capacitor coupling RCC connected from the battery side of its coil to a common clear connection CLE. All the relays RLC which are held operated via hold resistor HR and front contacts 2, are released when necessary, by applying earth to this common connection CLE, which connects a discharged capacitor across each relay. Instruction codes 12, 13 and 14, provide an earth connection from EL, FIG. 13, via RLOC3 front, FIG. 12, RLJ2 back, RLK1 front, RLL1 front, lead CLE. Instruction codes 13 and 14 also energise highways 13 and 14 respectively from earth via RLN4 front, FIG. 12, RLL4 front, RLK3 front, and RLM3 front or back. Instruction code 12 does not energise any highway, so that this instruction is used to empty store RLC ready to count the answer to a division operation.

Figure 7:
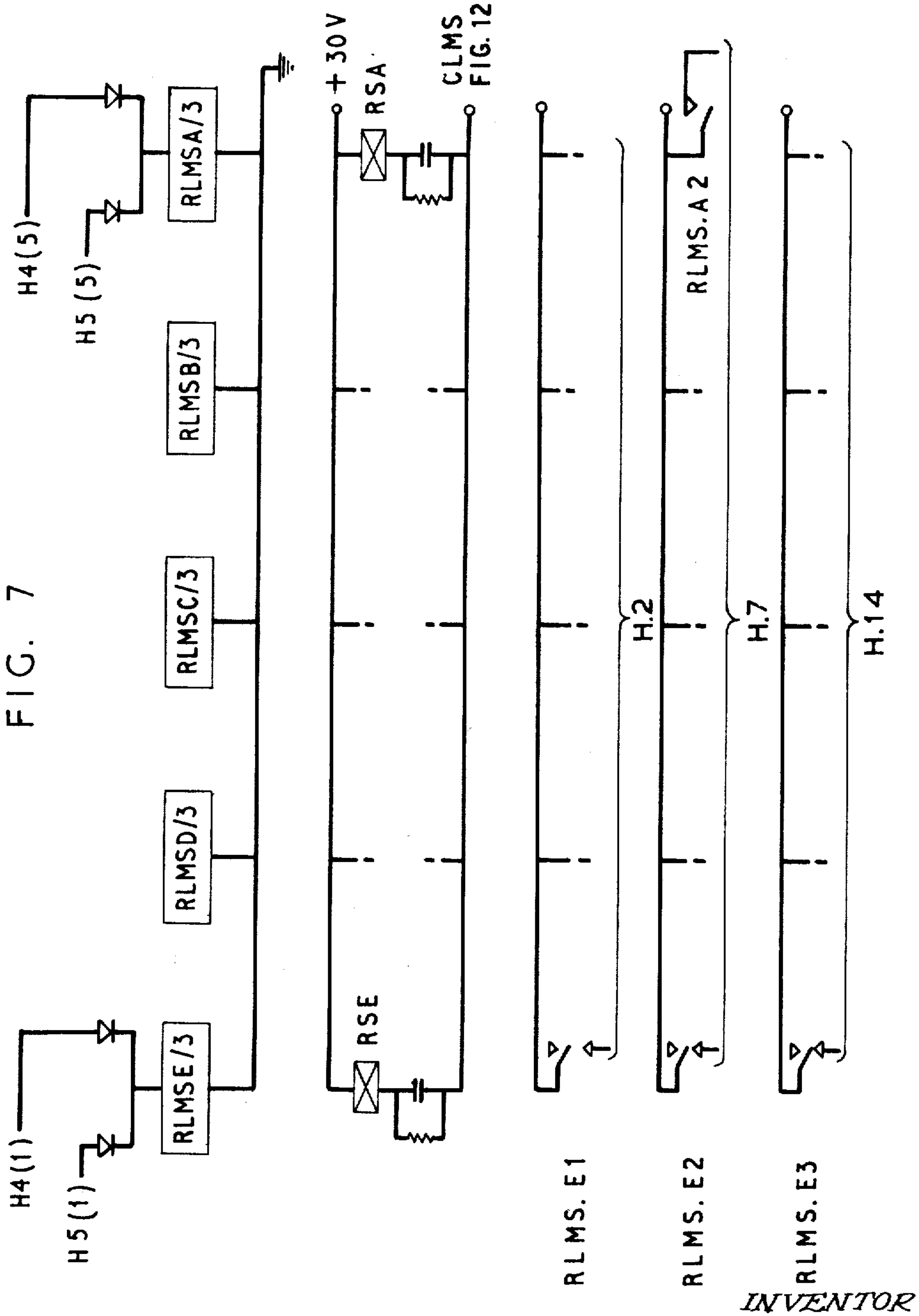
FIG. 7 shows the main store and associated circuits.

The Main Store code relays RLMS, FIG. 7, are operated as required by battery connections transmitted along the 5 bit-wires of one or other of highways 4 or 5, to store information as in the main store of a commercial computer, although in this case, the Main Store can only store one "word" instead of legion. Contacts 1, 2, and 3, of the five relays provide the start of highways 2, 7, and 14, via which numbers stored in the RLMS relays can be transferred to other parts of the machine.

By using highways 2 and 5 in succession, a number stored in the Main Store can be negated on to relays RLB and returned to relays RLMS as the negation of the original number: that is, N can be changed into (31–N).

Relays RLMS, A to E are mechanically latched, and can be released simultaneously when necessary by applying earth to a common connection, allowing battery to operate all their release coils RSA–RSE. An electrical hold, using fourth contacts of standard relays, may be used with "Capacitor-clear" gear as described for relays RLA and relays RLC.

The Function Decoder, FIG. 12, comprises five-bit relays RLK–N, which store bits 8, 4, 2, 1 in that order, and a relief relay RLKD which follows relay RLK. Contacts of the code relays are arranged in chains corresponding to the various bit-combinations used as codes, and these chains provide starting connections for the various functional operations of the machine. Back contacts RLKD3 constitute the apex of a "tree" of circuits and provide battery connection for energising highways 0 to 7 inclusive, distributed by contacts RLL3; RLM2; RLN1, 2, and 3; and RLM6 and 7.

The battery connection reaches RLKD3 for distribution, from RLK3 back, MR126, RLJ1 back (so that a Jump disconnects the "tree") and front contacts RLOC4. RLOC4 front contacts are included to provide a delay at each hub, between the provision of earth supply at the hub, which sets up a pattern of relays in the function decoder, FIG. 12, according to which instruction is plugged; and the *use* of the new function selected.

Instruction codes 8–14 operate RLK and RLKD, so that contacts RLKD3 remove battery from the "tree" circuits extending therefrom so that highways 0 to 7 are immobilised.

Contacts RLM5 switch the "Least Significant Carry" lead LSC, to the arithmetic unit, FIG. 9, to give an end-around "carry" via lead ACL, when subtracting or dividing, and as this change-over may cause movements of relays RLS in the arithmetic unit, relay RLKD is incorporated, which is slow-to-operate, but quick-to-release due to the associated series resistor KRS, the parallel resistor-capacitor coupling KCC, and metal rectifier KRC allowing rapid change of the capacitor, but only slow discharge.

The successive changes taking place when the programmed wiper switch D provides earth to a hub plugged with instruction codes 10 or 11, for subtract or divide, are as follows:

Earth at the hub energises function decoder relays, FIG. 12, RLK(8), RLM(2), and RLN for 11 only.

RLK2 back contact opens, so no earth connection remains to pulse-up RLOC, FIG. 10, and since RLL is not operated on any of the four arithmetic codes 8–11, RLL1 front contact cannot supply earth to RLOC either. Therefore RLOC will not be operated until RLY4 front contacts will operate it later on. The resistor and inductance between relay RLOC and lead KL to back contacts RLK2, FIG. 12, are included to minimise any momentary energising of RLOC before RLK back contact has opened properly.

RLM5, FIG. 12, changes the connection to LSC, FIG. 9. The disconnection of AAL releases any operated relays RLS, FIGS. 9 and 11, discharging their associated storage capacitors CLC, FIG. 11, via RLKD1 back, which has not yet opened.

Simultaneously with the opening of RLK2 back, the other back contacts of RLK are opened which perform the following operations:

(a) RLK1 back opens, so that later when RLOC3 front supplies earth via RLJ2 (so that a Jump which changes over RLJ2, will disconnect "Clear" connections), it will not clear relays RLB via RLL2 back contact.

(b) RLK3 back opens, so no battery connection is left on, through MR6, to the middle spring of RLM8. On instruction code 11, for "divide," RLM8 front then supplies effective battery from ADL, FIGS. 9 and 12, to point *x*, FIGS. 10 and 12, via RLJ1 back (opened during a Jump) and RLN4 front, so that continuous operation of RLX, FIG. 10, can take place for automatic division, until battery supply disappears from ADL, FIGS. 9 and 12, with the appearance of a negative result in the arithmetic unit.

On instruction code 10, for "Subtract," RLN4 back contact augments the power supply from the middle spring of RLM8, with a definite battery connection via MR3. This ensures that "subtraction" will always take place, even if it results in a negative number, and also ensures a battery supply to energise highway 14 as discussed below. The front contacts of RLK now close, simultaneously, with the following results:

RLK3 front has no effect on arithmetic codes, because RLL is not operated, so that RLL4 front is not closed, and MR6 prevents any connection of battery to energise highways 13 or 14; RLK2 front supplies earth, which begins the slow operation of relay RLKD; RLK1 front arranges connection so that when later RLKD2 front supplies earth via EL, FIG. 12, RLK2 front, RLKD2 front, RLJ2 back (which are opened during Jump operations) and RLK1 front, RLL1 back, and so on, the controller relay RLX, FIG. 10 will be able to operate, if the binary signalling counter contacts, FIG. 8, are closed.

RLKD operates, RLKD3 back contact opening so that later, when RLOC4 front contact supplies a battery connection, it will not be routed to energise any of highways 0 to 7.

RLKD1 back contact removes the discharging busbar connection in the arithmetic unit, FIG. 11, any storage capacitors needing to be discharged being almost completely discharged by this time via DSL.

RLKD1 front contact enables the discharge of any charged storage capacitors, ready for when the arithmetic unit operation will begin.

RLKD2 front contact supplies earth, EL, RLK2 front, RLKD2 front, RLJ2 back, RLK1 front, RLL1 back, to begin operation of the controller relays RLX, RLY, FIG. 10.

RLX back contacts begin to open, after a delay (to allow time for proper closure of the enabling contact RLKD1 front) caused by resistors and capacitors close to point *x*, FIG. 12.

A single operation of the controller is caused for both add (8) and subtract (10) as already explained, by RLOC4 back contacts removing battery connection from point *x*, FIGS. 10 and 12, as they operate.

For multiply, (9) RLN4 front contacts provide an uninterrupted battery supply from RLM8 back, RLJ1 back, via MR1.

For divide, (11) RLM8 front contacts provide battery only until a negative result appears in the arithmetic unit, causing an automatic end to the division process.

Contacts RLK1 provide earth, derived in various ways, for distribution via RLL1, RLL2, and RLM1 in various combinations, to clear store connections.

RLL1 also distributes the earth connection for operation of the controller (RLL1 back) and pulsing of RLOC for highways 12, 13, 14, (using RLL1 front). Instruction code 12 clears RLC store but does not energise any highway.

Instruction code 13 clears RLC store, and also energises highway 13 by supplying battery as follows: RLM8 back, RLJ1 back, RLN4 front, MR4, RLL4 front, RLK3 front, RLM3 back.

Instruction code 14 clears RLC store, and also energises highway 14 by supplying battery as follows: RLJ1 back, RLOC4 front, RLM4 front, MR5, RLL4 front, RLK33 front, RLM3 front.

I claim:

1. A computer comprising programme control means arranged to control the functions forming a programme and their sequence, a multi-bit function code decoder which comprises an electro-mechanical contact-making relay per bit, and circuits incorporating contacts of said relays for initiating any one of a number of computer functions under control of said programme control means, switching means operable in response to a Jump or Conditional Jump Instruction to make the programme control means traverse a plurality of functions in a programme sequence, an over-riding relay also operable in response to a Jump or Conditional Jump Instruction, and over-riding relay contacts in a battery-feed circuit common to said function-initiating circuits operation of which inhibits all said computer functions, so that the Jump is made without the performance of any functions allocated to function positions passed over during the Jump.

2. A computer comprising arithmetic equipment, data storage equipment, signalling channels interconnecting various parts of said equipments, an electro-mechanical contact-making wiper programme-switch, and means for selectively connecting each of a number of switch positions to one or more of a set of wires constituting an electrical multi-bit code signal channel, which is connected to an electrical function code decoder arranged to initiate the performance by said arithmetic equipment of the various functions as required utilising data stored in said data storage equipment.

3. A computer as claimed in claim 2, wherein each of a number of bank contacts of said programme switch is wired in parallel to a first plurality of plugs and which comprises a jack multiple including a second plurality of jacks per bank contact (which second plurality can be equal to or greater than the first plurality), corresponding jacks in said second pluralities being connected together and to a respective signal wire, so that there is a set of signal wires for transmitting coded functions signals determined by inserting any one of more plugs of a plug set into a selected one or more of the associated jack set.

4. A computer as claimed in claim 1 comprising manual plug-board means for setting up a programme sequence which may include Stop instructions, and Jump instructions, and comprising function priority circuits including said over-riding relay, so arranged that Jump instructions over-ride all other instructions, and Stop instruction over-ride all other instructions except Jump instructions.

5. A computer as claimed in claim 4 wherein said plug-board means comprises a step-by-step electromechanical programme wiper switch, each bank contact of which is individually associated with plug-and-jack equipment for setting up data-input; arithmetic; data transfer; and data output, functions as well as Jump and Stop functions.

6. A computer as claimed in claim 5 wherein said plug-and-jack equipment also controls a repetitive function counter.

7. A computer as claimed in claim 5 wherein said plug-and-jack equipment includes single-ended multiple plug cords for plugging up individual sets of jacks on an "*x* out of *y*" basis to initiate the transmission of multi-bit binary functional codes to the computer control equipment so as to set up said data-movement, and arithmetic, functions, and double-ended plug cords for interconnecting jacks individual to programme positions, and jacks individual to functions so as to set up the ancillary functions such as Stop, and Jump.

8. A computer as claimed in claim 4 wherein said plug-board means comprises individual function signalling means for Jump and Conditional Jump, and operational Jump circuits comprising conditional switching means for controlling the Jump operation according to the condition of other operational circuits.

9. A computer as claimed in claim 5 wherein said plug-board means comprises individual function signalling means for Jump and Conditional Jump, and operational Jump circuits comprising conditional switching means for controlling the Jump operation according to the condition of other operational circuits.

References Cited

UNITED STATES PATENTS

| | | | |
|---|---|---|---|
| 3,043,510 | 7/1962 | Shekels | 235—157 |
| 3,374,462 | 3/1968 | Best et al. | 340—172.5 |
| 3,376,553 | 4/1968 | Neddenriep | 340—172.5 |

RAULFE B. ZACHE, Primary Examiner